United States Patent
Post, II

(10) Patent No.: US 7,455,142 B2
(45) Date of Patent: Nov. 25, 2008

(54) SCALING OF SIDE-TO-SIDE TORQUE BIAS TO IMPROVE CORNERING IN A PROGRAMMABLE FOUR WHEEL DRIVE SYSTEM

(75) Inventor: James W. Post, II, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 403 days.

(21) Appl. No.: 11/293,964

(22) Filed: Dec. 5, 2005

(65) Prior Publication Data

US 2007/0129872 A1    Jun. 7, 2007

(51) Int. Cl.
*B60K 28/16* (2006.01)

(52) U.S. Cl. .................. 180/197; 180/233; 180/245; 180/246; 477/35; 701/88

(58) Field of Classification Search ............ 180/197, 180/233, 245, 246; 477/35; 701/88, 91
See application file for complete search history.

(56) References Cited

U.S. PATENT DOCUMENTS

| | | | |
|---|---|---|---|
| 5,417,298 A * | 5/1995 | Shibahata | 180/76 |
| 5,701,247 A | 12/1997 | Sasaki | |
| 5,742,917 A | 4/1998 | Matsuno | |
| 6,033,337 A * | 3/2000 | Ohkuma et al. | 477/1 |
| 6,064,930 A | 5/2000 | Shibahata | |
| 6,208,929 B1 | 3/2001 | Matsuno et al. | |
| 6,393,351 B2 | 5/2002 | Frediani et al. | |
| 6,487,486 B1 | 11/2002 | Anderson | |
| 6,587,775 B2 | 7/2003 | Nishida et al. | |
| 6,634,451 B2 * | 10/2003 | Sakakiyama | 180/197 |
| 6,704,622 B2 * | 3/2004 | Tinskey et al. | 701/1 |
| 6,909,959 B2 * | 6/2005 | Hallowell | 701/88 |
| 7,175,557 B2 * | 2/2007 | Kirkwood et al. | 475/150 |
| 2004/0176899 A1 * | 9/2004 | Hallowell | 701/84 |
| 2006/0095188 A1 * | 5/2006 | Post, II | 701/70 |
| 2006/0199697 A1 * | 9/2006 | Kirkwood et al. | 477/5 |
| 2007/0294018 A1 * | 12/2007 | Nihanda | 701/69 |

FOREIGN PATENT DOCUMENTS

EP    0 844 129 A2    5/1998

OTHER PUBLICATIONS

Imada Takao et al., Driving Force Distribution Control Device for Automobile, Patent Abstracts of Japan, 07164923, Jun. 27, 1995.

* cited by examiner

*Primary Examiner*—Joanne Silbermann
*Assistant Examiner*—Tashiana Adams
(74) *Attorney, Agent, or Firm*—Rankin, Hill & Clark LLP; Mark E. Duell

(57) ABSTRACT

The present invention provides a method for improving cornering performance. From a given vehicle speed and lateral acceleration, in instances of a decrease in drive torque, individual wheel torque is shifted from inside wheels to outside wheels to increase vehicle yaw forces and counteract the understeer phenomenon. Similarly, in instances of increasing drive torque, individual wheel torque is shifted from outside wheels to inside wheels on a common axle to reduce vehicle yaw forces and counteract the oversteer phenomenon. Actual implementation of side-to-side torque shifting is done using a correction factor multiplied by other factors within a general torque shift equation.

9 Claims, 4 Drawing Sheets

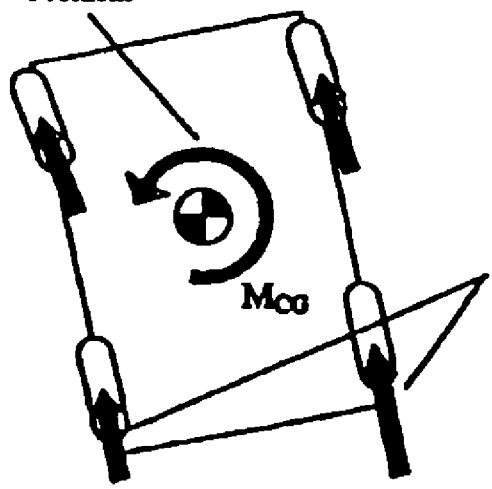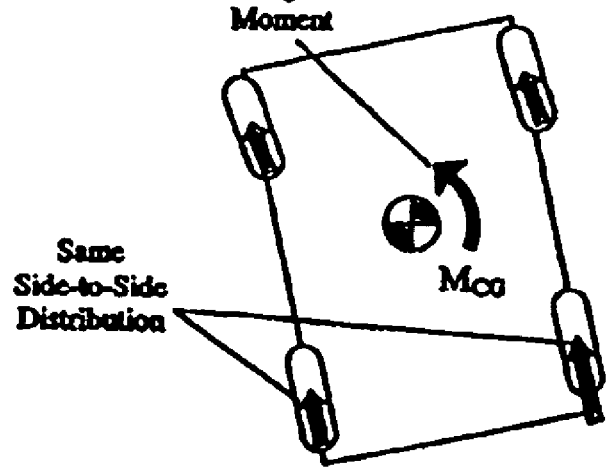
Fig. 1a
Fig. 1b

SCALING OF SIDE-TO-SIDE TORQUE BIAS TO IMPROVE CORNERING IN A PROGRAMMABLE FOUR WHEEL DRIVE SYSTEM

BACKGROUND OF THE INVENTION

1. Field of the Invention

The present invention is generally directed toward a method for improving cornering performance in a four wheel drive vehicle by scaling the side-to-side drive torque bias in response to changes in total driveline torque.

2. Description of Related Art

In the area of electronic drive torque distribution control, it is possible to shift drive torque to various driven wheels in accordance with specific vehicle operational conditions and sensed driver needs. During cornering it is advantageous to send more drive torque to the outside wheel of a given drive axle to enhance the transient characteristics of the vehicle's turning behavior.

During situations of combined acceleration and turning it can be particularly difficult to achieve consistent line trace performance when the drive torque is increased and/or decreased either by driver demand and or variations in system functioning. In an attempt to maintain consistent line trace while the drive torque is varied, it is important to maintain a relatively constant yawing moment from the distributed drive torque.

In various state of the art driveline control systems, there is a consistently varying yaw moment from the drive torque at a given trimmed lateral acceleration. As the drive torque increases and/or decreases, the amount of yawing moment changes and the overall line trace is not maintained.

Current practice is illustrated in FIG. 1. The drive torque distribution on a given axle (side-to-side distribution) is biased toward the outside wheel (as represented by different arrow sizes on the wheels) in order to provide enhanced traction and line trace capability. This side-to-side bias (or torque split) creates an "inward" turning moment on the vehicle body and helps to direct the vehicle inward in the turn as drive torque increases. As the total drive torque increases and/or decreases, and the side-to-side bias ratio does not change, the amount of inward yawing moment changes according to the delivered level of drive torque. Because of this behavior, perturbations in the line trace behavior occur. Starting from a quasi-equilibrium position at a prescribed lateral acceleration, as total drive torque is increased the inward yawing moment increases and the vehicle begins to "tighten its line". Conversely, starting from a quasi-equilibrium position at a prescribed lateral acceleration where there is an existing high level of drive torque and drive torque is lessened, the vehicle begins to "loosen its line" as the inward turning moment is released. Both situations cause noticeable and undesirable disturbances in the driving trajectory. A method and system that avoids these situations is desired.

SUMMARY OF THE INVENTION

The present invention provides a method for improving cornering performance. From a given vehicle speed and lateral acceleration, in instances of a decrease in drive torque, individual wheel torque is shifted from inside wheels to outside wheels on a common axle to increase vehicle yaw forces and counteract an understeer phenomenon. Similarly, in instances of increasing drive torque, individual wheel torque is shifted from outside wheels to inside wheels on a common axle to reduce vehicle yaw forces and counteract an oversteer phenomenon. Actual implementation of side-to-side torque shifting is done using a scaling factor (0.0 to 1.0) multiplied by other factors within a general torque shift equation.

BRIEF DESCRIPTION OF THE DRAWINGS

These and further features of the invention will be apparent with reference to the following description and drawings, wherein:

FIGS. 1a and 1b are schematic diagrams of a vehicle illustrating, in general, distribution of drive torque and turning behavior with respect to variations in total drive torque;

DETAILED DESCRIPTION OF THE PREFERRED EMBODIMENTS

Figure 2B:
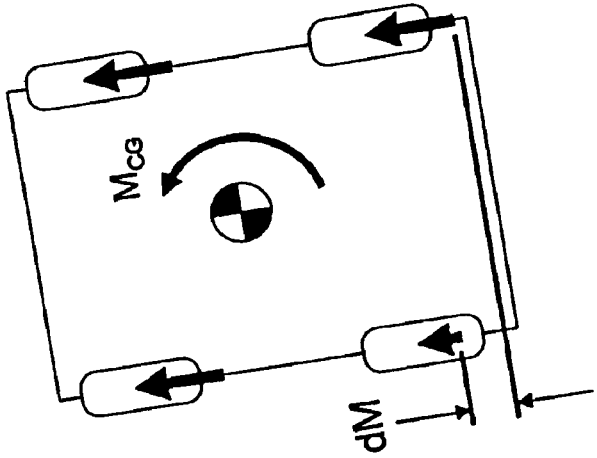
FIG. 2b is a schematic diagram of a vehicle illustrating the turning behavior utilizing axle side-to-side bias to generate an inward turning moment in an instance of small total drive torque.

The method according to the invention comprises the steps of estimating the total drive torque generated by the vehicle. The estimated total drive torque is then used to modify the side-to-side distribution of actual drive torque by using one or more scaling factors in addition to any other side-to-side torque distribution means already in place. Proper distribution of drive torque maintains a constant vehicle inward yaw moment and as a result produces predictable line trace performance. The method is described in greater detail below.

As used in this description and in the appended claims, the following terms will have the definitions indicated thereafter:

"drive torque" means torque generated by the vehicle engine and transmission and distributed between the four vehicle wheels;

"total drive torque" means the sum of the drive torque applied to all four vehicle wheels;

"inside wheels" mean the front and rear wheels on a common side of a vehicle that define a smaller radius during a vehicle turn;

"outside wheels" mean the front and rear wheels on a common side of a vehicle that define a larger radius during a vehicle turn; and "side-to-side bias" means the ratio between the drive torque distributed to the inside wheels and the drive torque distributed to the outside wheels on a single axle of the vehicle.

The total drive torque of a vehicle varies during operation of the vehicle. Variations in total drive torque are caused by one or more of the following factors: operator torque demand, increased/decreased vehicle speed, traction requirements, braking requirements and other stability requirements. Factors such as traction requirements cause drive torque to be distributed differently amongst the vehicle's four wheels. Additionally, as previously stated, side-to-side distribution of torque between inside and outside wheels can, in part, be determined by the steering angle of the vehicle to provide increased traction. The turning of the vehicle also creates a measurable component of lateral acceleration.

In order to maintain similar levels of inward yawing moment for a given vehicle condition (i.e. speed and lateral acceleration), the side-to-side bias of drive torque must be large for small total drive torque outputs and small for large total drive torque outputs. Referring to FIG. 2a, a vehicle is shown turning to the left; and due to an asymmetric drive torque distribution of the total drive torque amount, a yawing moment $M_{cg}$ is generated. Large arrows on the vehicle wheels represent the magnitude of drive force applied at each wheel, respectively. The drive force at each wheel is related to each wheel's drive torque through the loaded radius of the tire/wheel assembly, thus, the arrows on the wheels are also representative of drive torque. The sum of the magnitudes of each individual arrow is equal to the total drive torque of the vehicle.

The side-to-side bias of drive torque is represented by the size relationship of the arrows on the right and left sides of the vehicle on a common axle, namely the ratio of the length of the larger to the length of the smaller. Referring again to FIG. 2a which illustrates a side-to-side bias of 4:3, the relative sizes of the arrows on the right and left wheels of the rear axle, as explained below, also indicate the applied yaw moment created by the left-right drive torque difference and can be denoted by the quantity dM (assuming lateral tire force is not significantly influenced by the presence of these longitudinal driving forces).

To further illustrate the calculation of the applied yaw moment, FIG. 2a also shows moment arms (20a, 20b) representing the perpendicular distance from the line of action of each wheel's drive force to the vehicle center of gravity. Moment arm 20a is the vehicle's front axle half-track width and is symmetric between the left and right side. Moment arm 20b is the vehicle's rear axle half-track width and is symmetric between the left and right side. The track width is the lateral distance between two tire contact patch center on a given axle. The moment generated about the vehicle center of gravity by the front axle wheel force components perpendicular to the moment arms, 20a on each side cancel each other because the applied forces at each front wheel are equal. On the rear axle the moment generated by the force component perpendicular to the moment arm 20b of the right wheel exceeds that generated by the force component perpendicular to the moment arm 20b of the left wheel by a factor that is equal to the length difference, dM, between the representative arrows shown on the rear axle. Thus, in comparing the ration of the lengths of the arrows, the side-to-side bias of the rear axle illustrated in FIG. 2a is 4:3 and creates a defined yaw moment $M_{cg}$. The quantity dM represents the difference in the two rear wheel drive torque values.

Figure 2A:
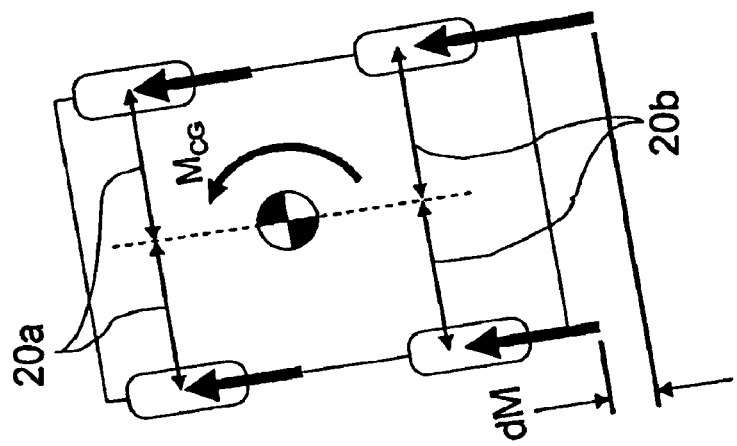
FIG. 2a is a schematic diagram of a vehicle illustrating the turning behavior utilizing axle side-to-side bias to generate an inward turning moment in an instance of large total drive torque.

Referring to FIG. 2b, the side-to-side bias of drive torque represented by arrows on the wheels of the rear axle is 2:1, which is larger than the ratio of 4:3 shown in figure 2a. However, the applied yaw moment, also depicted by the quantity $M_{cg}$, is the same as that of FIG. 2a since the arrow difference length of the two rear axle drive torques is also equal to dM. The side-to-side bias is larger than in FIG. 2a, but the resulting yaw moment is the same. Because of the lower total drive torque represented by the sum of all arrow lengths (compared to FIG. 2a), a larger side-to-side bias is needed to create the same yaw moment $M_{cg}$. Thus, the larger side-to-side bias creates an equivalent yaw moment contribution and as a result the yaw moment is constant between the illustrated instances in FIG. 2a and FIG. 2b.

It will be understood that additional yaw moment can be created by varying the side-to-side bias between wheels on the vehicle front axle. It will also be understood that in an instance where the vehicle is turning in an opposite direction, the side-to-side bias is reversed.

Figure 3:
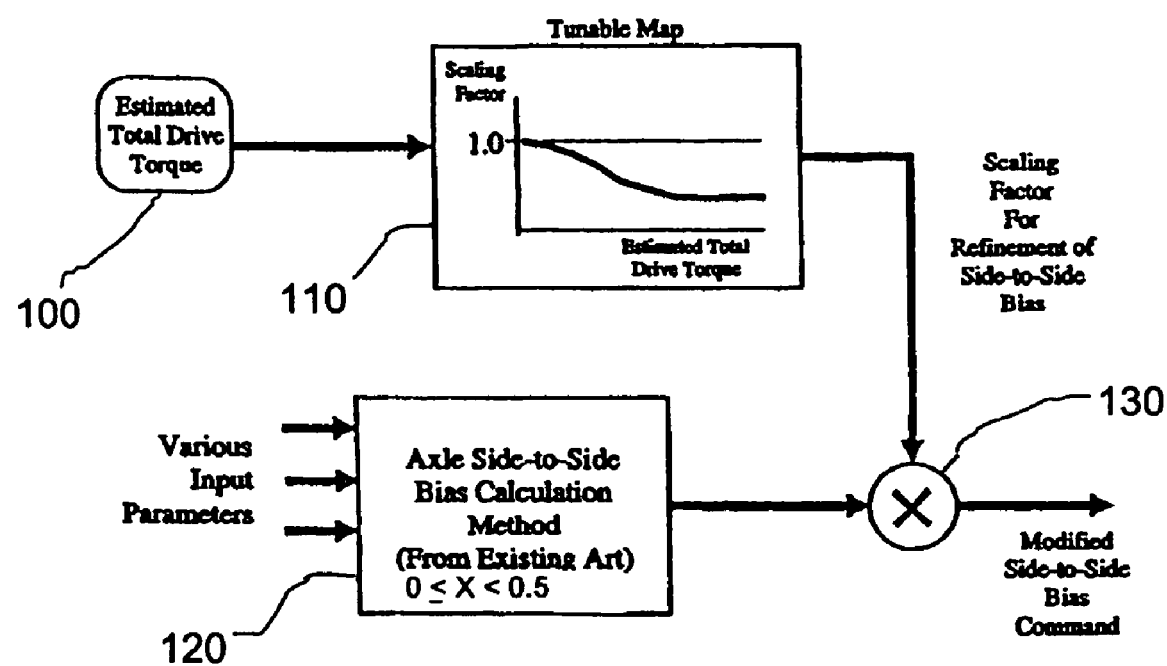
FIG. 3 is a schematic representation of the integration of a side-to-side bias scaling factor depending on total estimated drive torque.

Referring to FIG. 3, integration of the side-to-side bias based on total drive torque with other vehicle side-to-side bias calculations in a programmable four wheel drive system is illustrated for a single vehicle axle. In step 120, existing state of the art calculates a side-to-side bias coefficient (X) based on various input parameters such as lateral acceleration (lateral G), vehicle speed and estimated driver intent. The range of the bias coefficient is between a value of 0 to 0.5. A value of 0 indicates no additional torque transfer to the outside wheel, or the two wheels on a given axle have the same intended torque. A value of 0.5 indicates that all the torque on a given axle is intended to be transferred to the outside wheel. In step 100 an estimation of the total drive torque is made. In step 110, depending on the estimated total drive torque, a side-to-side bias scaling factor is taken from a stored table of pre-determined values. At small values of estimated total drive torque, the bias scaling factor from operation 110 approaches 1.0 (meaning that there is no intended modification to the side-to-side bias coefficient calculated in operation 120), so that when multiplied by the result of operation 120 in operation 130, the end result is the side-to-side bias factor itself. As the estimated drive torque increases, the bias scaling factor reduces in magnitude such that when multiplied to the result of operation 120 in operation 130, the modified side-to-side bias command is smaller, indicating a smaller amount of torque transfer between the two wheels on a given axle. Application of the modified side-to-side bias command to the programmable vehicle control system provides a condition where the yaw moment of the vehicle is maintained generally constant in a cornering situation with variable total drive torque and the vehicle does not tend to tack inward or outward.

Figure 4:
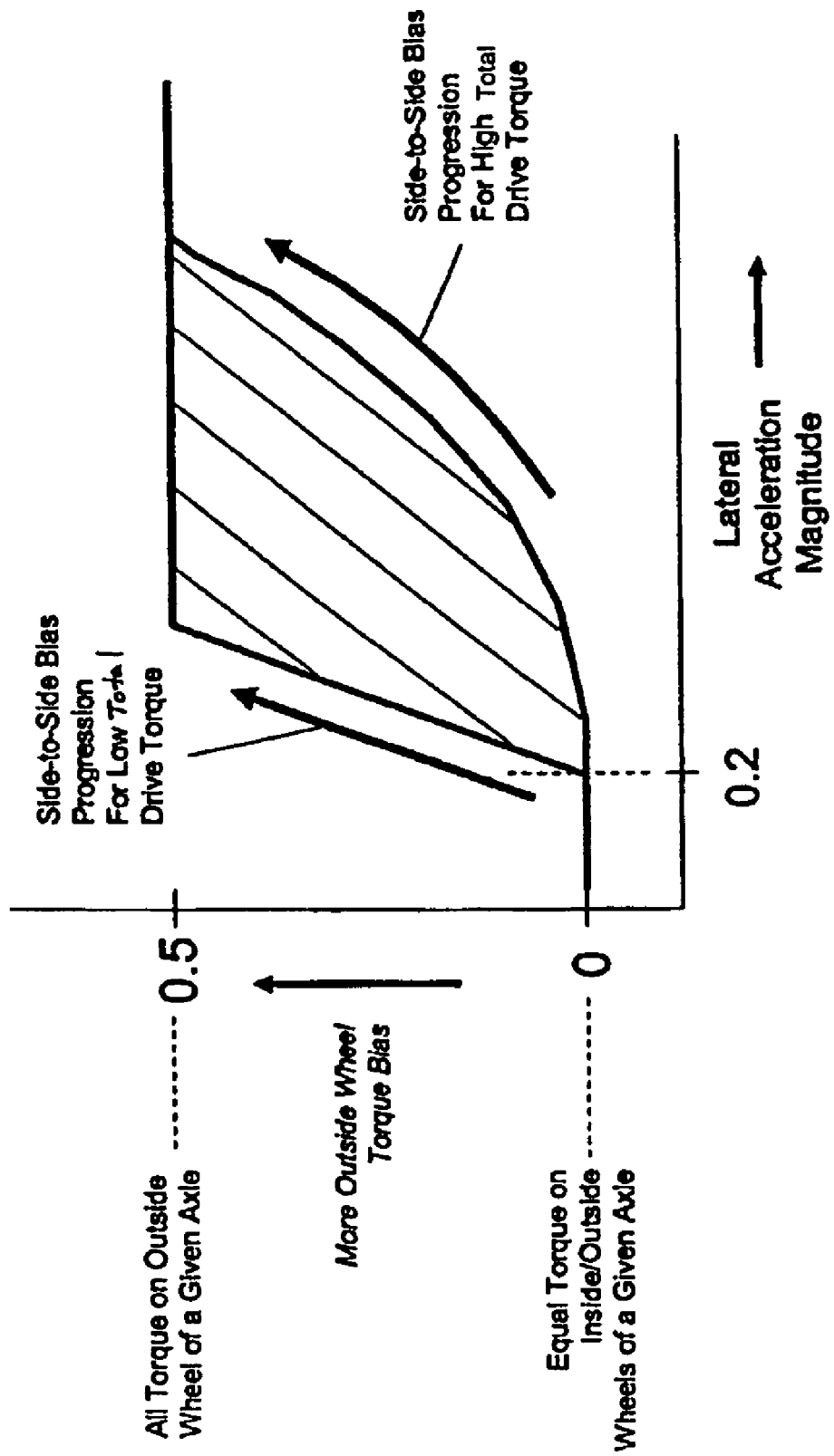
FIG. 4 is a graphical representation of an alternative side-to-side bias scaling factor depending on measured vehicle lateral acceleration.

Referring to FIG. 4, as an additional method of pictorially showing the effect of maintaining a consistent yaw moment, the side-to-side bias coefficient is scaled according to measured or calculated lateral acceleration of the vehicle. Once the lateral acceleration of the vehicle reaches a threshold value, preferably 0.2 g, side-to-side bias is increased to the outside wheel(s). As lateral acceleration increases, the side-to-side bias to the outside wheel(s) can be increased quickly or gradually. The rate of increase will depend on the vehicle speed as well as the previously disclosed method for changing the side-to-side bias command depending on estimated total drive torque. For the case of low estimated total drive torque, the gradient of the rise is steep indicated by the label in FIG. 4. For the case of high estimated total drive torque the rate of increase is more gradual. The region in-between the two lines represents the total operational area of the side-to-side transfer. It may be noted that the gradient of either line (low total drive torque or high total drive torque) may also be scaled by vehicle speed or a variety of other operational parameters.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A feed-forward method of improving cornering performance in a vehicle comprising the steps of:

estimating total vehicle drive torque;

providing a preliminary side-to-side drive torque bias adjustment between wheels on a single common axle based on the estimated total vehicle drive torque; and integrating said preliminary side-to-side drive torque bias adjustment with other side-to-side bias adjustments within a programmable four wheel drive system wherein when estimated total vehicle drive torque increases, the preliminary side-to-side bias adjustment always decreases.

2. The method of improving cornering performance of claim 1, wherein the vehicle is accelerating as well as cornering.

3. The method of improving cornering performance of claim 1, wherein the vehicle has a constant speed and lateral acceleration.

4. The method of improving cornering performance of claim 1, wherein said side-to-side bias adjustment between wheels on a common axle based on the estimated vehicle torque is provided as a scaling factor which is multiplied times the other side-to-side bias adjustments.

5. A feed-forward method of improving cornering performance in a vehicle comprising the steps of:

estimating total vehicle drive torque;

providing an preliminary side-to-side drive torque bias adjustment between wheels on a single common axle based on the estimated total vehicle drive torque; and integrating said preliminary side-to-side drive torque bias adjustment with other side-to-side bias adjustments within a programmable four wheel drive system wherein when estimated total vehicle torque decreases, the side-to-side bias adjustment always increases.

6. A feed-forward method of improving cornering performance in a vehicle comprising the steps of:

estimating the lateral acceleration of the vehicle;

providing a side-to-side drive torque bias between wheels on a single common axle based on the estimated lateral acceleration wherein when the estimated lateral acceleration increases, the side-to-side drive torque bias provides more drive force to an outside wheel on a given vehicle; and controlling the rate of change of side-to-side drive torque bias in relation to the increase of estimated lateral acceleration (bias progression rate) such that this rate is always greater when an estimated total vehicle drive torque is high in comparison to a lower total vehicle drive torque wherein the progression rate is smaller.

7. The method of improving cornering performance of claim 5, wherein the vehicle is accelerating as well as cornering.

8. The method of improving cornering performance of claim 5, wherein the vehicle has a constant speed and lateral acceleration.

9. The method of improving cornering performance of claim 5, wherein said side-to-side bias adjustment between wheels on a single common axle based on the estimated vehicle torque is provided as a scaling factor which is multiplied times the other side-to-side bias adjustments.

* * * * *

UNITED STATES PATENT AND TRADEMARK OFFICE
CERTIFICATE OF CORRECTION

| | | |
|---|---|---|
| PATENT NO. | : 7,455,142 B2 | Page 1 of 1 |
| APPLICATION NO. | : 11/293964 | |
| DATED | : November 25, 2008 | |
| INVENTOR(S) | : Post, II | |

It is certified that error appears in the above-identified patent and that said Letters Patent is hereby corrected as shown below:

Column 6, Line 11 (Claim 6, Line 9), after "vehicle", insert --axle--.

Signed and Sealed this

Twenty-fourth Day of March, 2009

JOHN DOLL
*Acting Director of the United States Patent and Trademark Office*